(12) United States Patent
Kwon et al.

(10) Patent No.: US 8,552,112 B2
(45) Date of Patent: Oct. 8, 2013

(54) WEATHERABLE THERMOPLASTIC RESIN COMPOSITION HAVING EXCELLENT LOW GLOSS CHARACTERISTIC AND METHOD OF PREPARING THE SAME

(75) Inventors: So Young Kwon, Uiwang-si (KR); Young Sub Jin, Uiwang-si (KR); Sung Kwan Kim, Uiwang-si (KR); Byeong Do Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 186 days.

(21) Appl. No.: 12/980,668

(22) Filed: Dec. 29, 2010

(65) Prior Publication Data

US 2011/0160397 A1 Jun. 30, 2011

(30) Foreign Application Priority Data

Dec. 31, 2009 (KR) .................. 10-2009-0136041
Oct. 1, 2010 (KR) .................. 10-2010-0095785

(51) Int. Cl.
*C08C 19/20* (2006.01)
*C08L 25/12* (2006.01)
*C08L 33/08* (2006.01)
*C08L 33/10* (2006.01)
*C08J 3/24* (2006.01)

(52) U.S. Cl.
USPC ............... 525/66; 525/63; 525/69; 525/72; 525/78; 525/79; 525/80; 525/53; 525/212; 525/221; 525/222; 525/230; 525/227; 525/238; 525/263; 525/242

(58) Field of Classification Search
USPC ......... 525/63, 66, 69, 72, 78, 79, 80, 53, 242, 525/212, 221, 222, 230, 227, 238, 263
See application file for complete search history.

(56) References Cited

U.S. PATENT DOCUMENTS

| 3,426,101 A | 2/1969 | Ryan et al. |
| 3,944,631 A | 3/1976 | Yu et al. |
| 4,169,869 A | 10/1979 | Milenius |
| 4,460,742 A | 7/1984 | Kishida et al. |
| 4,652,614 A | 3/1987 | Eichenauer et al. |
| 4,668,737 A | 5/1987 | Eichenauer et al. |
| 5,237,004 A | 8/1993 | Wu et al. |
| 5,475,053 A | 12/1995 | Niessner et al. |
| 5,580,924 A | 12/1996 | Wildi et al. |
| 5,910,553 A | 6/1999 | McKee et al. |
| 6,051,656 A | 4/2000 | McKee et al. |
| 6,111,024 A | 8/2000 | McKee et al. |
| 6,187,862 B1 | 2/2001 | Chang et al. |
| 6,395,828 B1 | 5/2002 | Chang et al. |
| 6,696,165 B1 | 2/2004 | Bennett et al. |
| 6,890,965 B1 | 5/2005 | Johnson et al. |
| 8,222,344 B2 | 7/2012 | Jin et al. |
| 2004/0024122 A1 | 2/2004 | Chang et al. |
| 2007/0287799 A1 | 12/2007 | Ha et al. |
| 2010/0105840 A1* | 4/2010 | Jin et al. .................. 525/222 |
| 2011/0160396 A1 | 6/2011 | Jin et al. |

FOREIGN PATENT DOCUMENTS

| DE | 19614846 A1 | 10/1997 |
| JP | 07-316243 A | 12/1995 |
| KR | 10-2003-0034796 A | 5/2003 |
| KR | 2008-0036790 A | 4/2008 |

OTHER PUBLICATIONS

European Office Action in commonly owned European Application No. 09174487 dated May 11, 2011, pp. 1-4.
European Search Report in commonly owned European Application No. 09174487, dated Feb. 16, 2010.
Office Action in commonly owned U.S. Appl. No. 12/979,448 mailed Sep. 13, 2012, pp. 1-14.

* cited by examiner

*Primary Examiner* — Roberto Rabago
(74) *Attorney, Agent, or Firm* — Summa, Addition & Ashe, P.A.

(57) ABSTRACT

The present invention provides a weather resistant thermoplastic resin with low gloss and a method of preparing the same. The thermoplastic resin of the present invention comprises a (meth)acrylic acid alkyl ester-based polymer (A) and a (meth)acrylic acid alkyl ester-based oligomeric prepolymer (B), and an aromatic vinyl-cyanide vinyl based copolymer (C), wherein the (meth)acrylic acid alkyl ester-based polymer (A) and the (meth)acrylic acid alkyl ester-based oligomeric prepolymer (B) form a network-shaped disperse phase and the aromatic vinyl-cyanide vinyl based copolymer (C) forms a continuous phase.

14 Claims, 1 Drawing Sheet

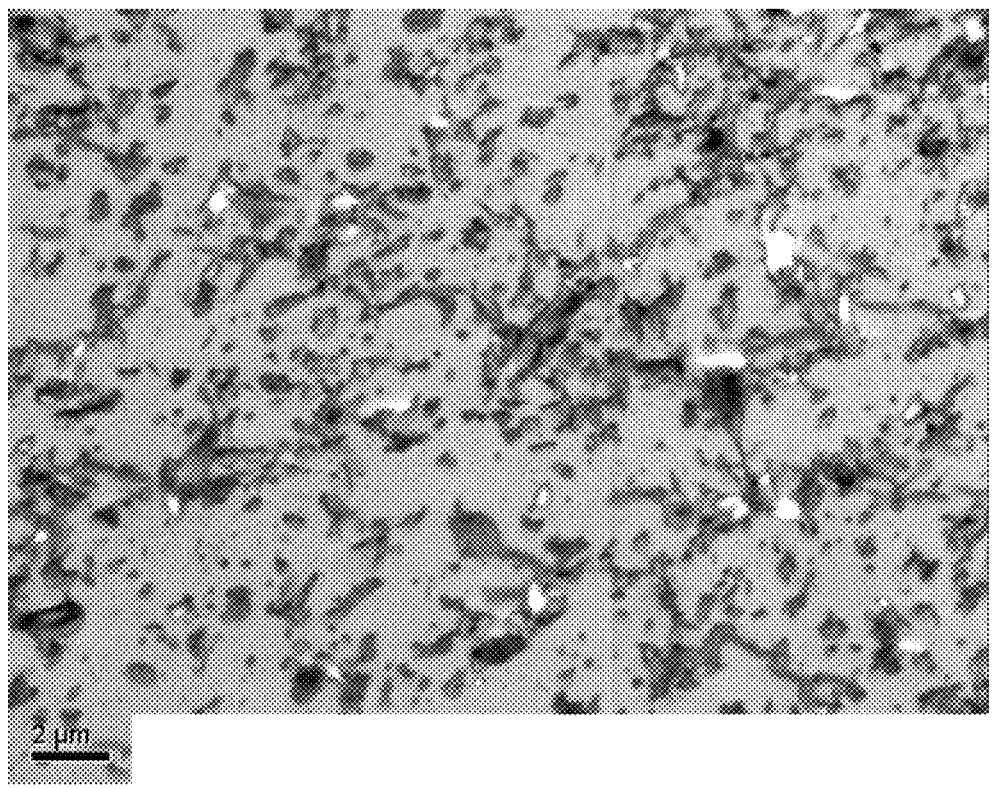

WEATHERABLE THERMOPLASTIC RESIN COMPOSITION HAVING EXCELLENT LOW GLOSS CHARACTERISTIC AND METHOD OF PREPARING THE SAME

CROSS-REFERENCE TO RELATED APPLICATIONS

This application claims priority from Korea Patent Application Nos. 10-2009-0136041 and 10-2010-0095785, filed on Dec. 31, 2009 and Oct. 1, 2010, respectively, in the Korean Intellectual Property Office, the disclosure of each of which is incorporated herein by reference in its entirety.

FIELD OF THE INVENTION

The present invention relates to a weather resistant thermoplastic resin that can have excellent low gloss characteristics and a method of preparing the same.

BACKGROUND OF THE INVENTION

Acrylonitrile-butadiene-styrene resins (also "ABS" resins) are used in a variety of applications including automobiles, electric and electronic equipment, business machinery, home appliances, toys, and the like due to their excellent impact resistance and workability, superior mechanical strength, thermal deformation temperature, and beautiful external appearance. However, ABS resins are easily deteriorated by sunlight and ultraviolet (UV) radiation since the butadiene-based rubber component used in the ABS resins comprises a chemically unstable double bond. Therefore, the use of ABS resins is limited for many products that are used outdoors and/or exposed to UV radiation, such as electric and electronic components, materials for farm machines and implements, road signboards, finishing materials for buildings, door panels, window frames, leisure/household goods, sports equipment, automobile supplies, and the like.

Weather resistant stabilizers can be added to ABS resins to improve weatherability. Techniques using weather resistant stabilizers can, however, have limited effectiveness. Accordingly, research efforts have looked to replace ABS resins with acrylate-styrene-acrylonitrile (also "ASA" resins) resins, which include a chemically stable acrylic-based rubber instead of a butadiene-based rubber.

Recently, there has also been an increased focus on the development of thermoplastic resins that can be directly used without coating or painting due to environmental concerns. In addition, there is also increased demand for thermoplastic resins with low gloss characteristics in view of customer expectations, who often prefer the high-grade external appearance of low gloss products. For example, ASA resins used for outdoor applications can require low gloss characteristics.

Conventional methods for imparting a low gloss appearance to the surface of molded articles include embossing a surface of a molded article and coating the surface of the molded article with a low gloss material. The processing costs for such methods, however, can be expensive. Further, such methods may not sufficiently lower surface gloss. Therefore, there have been attempts to modify the ASA resins themselves to impart sufficiently low gloss characteristics.

U.S. Pat. No. 6,696,165 discloses a method for lowering the gloss of ASA resins by adding 0.1 to 20 parts by weight of a crystalline polymer such as a polyalkylene terephthalate, and U.S. Pat. No. 6,395,828 discloses a method for lowering the gloss of ASA resins by adding 0.5 to 15 parts by weight of a compound prepared by a reaction of an amine compound with epoxy.

U.S. Pat. Nos. 5,475,053 and 4,652,614 disclose methods of lowering the gloss of resins by using spherical graft copolymers as matting agents, and U.S. Pat. Nos. 4,169,869, 4,460,742 and 5,580,924 and Korean Patent Laid-Open Publication No. 2008-0036790 disclose methods of lowering the gloss of resins by using a variety of copolymers as additives.

Further, U.S. Pat. Nos. 4,668,737 and 5,237,004 disclose methods of lowering the gloss of resins by using rubber particles having a core/shell structure with a large particle diameter ranging from 0.05 to 20 µm or 2 to 15 µm.

However, problems including high production costs, delamination, property deterioration and partially increased gloss may occur when the additives are used as in the foregoing techniques. In addition, the use of large rubber particles can rapidly deteriorate the impact strength of the resins although the gloss of the resins can be advantageously lowered.

U.S. Pat. Nos. 3,426,101 and 6,187,862, Japanese Patent Laid-Open Publication No. Hei 7-316243, Korean Patent No. 10-0440474, and Korean Patent Application No. 2006-0051425 are directed to methods of preparing ASA resins by conventional techniques generally comprising the steps of preparing an alkyl acrylate-based latex core, preparing a graft polymer by graft polymerizing styrene and acrylonitrile on an outer layer of the core, and melting and kneading (mixing) the prepared graft polymer and a styrene-based thermoplastic resin. However, such methods of preparing the ASA resins use multiple steps which can increase production costs. Further such methods typically use a variety of emulsifiers and stabilizers to prepare the latex, which can deteriorate color characteristics.

U.S. Pat. Nos. 5,910,553, 6,111,024, and 6,051,656 disclose methods of preparing ASA resins by preparing alkyl acrylate copolymers through solution polymerization, drying the alkyl acrylate copolymers, performing bulk polymerization by injecting the dried alkyl acrylate copolymers into styrene-based monomers and acrylonitrile-based monomers, and converting the bulk polymerization into the suspension polymerization. However, these methods are not commercially viable, and there is the further drawback of additionally requiring a process to recover the final product from a suspension.

As discussed in the foregoing, despite the many attempts to provide ASA resins with excellent weatherability and low gloss characteristics, conventional techniques do not provide sufficient weatherability and gloss properties.

SUMMARY OF THE INVENTION

The present invention provides a weather resistant thermoplastic resin that can have excellent low gloss characteristics and a method of preparing the same.

In exemplary embodiments of the present invention, the thermoplastic resin comprises a (meth)acrylic acid alkyl ester-based polymer (A) and a (meth)acrylic acid alkyl ester-based oligomeric prepolymer (B), and an aromatic vinyl-cyanide vinyl based copolymer (C), wherein the (meth)acrylic acid alkyl ester-based polymer (A) and the (meth)acrylic acid alkyl ester-based oligomeric prepolymer (B) form a network-shaped disperse phase and the aromatic vinyl-cyanide vinyl based copolymer (C) forms a continuous phase.

The (meth)acrylic acid alkyl ester-based polymer (A) may include a (meth)acrylic acid alkyl ester compound unit and an unsaturated hydroxy or carboxylic acid compound unit.

In exemplary embodiments of the present invention, the (meth)acrylic acid alkyl ester-based polymer (A) comprises about 60 to about 95% by weight of a (meth)acrylic acid alkyl ester compound unit; about 1 to about 20% by weight of an unsaturated hydroxy or carboxylic acid compound unit, about 0 to about 20% by weight of an aromatic vinyl-based compound; and about 0 to about 10% by weight of a vinyl cyanide based compound.

The (meth)acrylic acid alkyl ester-based oligomeric prepolymer (B) can be prepared by polymerizing a mixture comprising a mercapto compound having either two or more carboxyl groups or two or more hydroxyl groups, and a (meth)acrylic acid alkyl ester monomer.

In exemplary embodiments of the present invention, the (meth)acrylic acid alkyl ester-based oligomeric prepolymer (B) includes a mole ratio of the mercapto compound having either two or more carboxyl groups or two or more hydroxyl groups to the (meth)acrylic acid alkyl ester monomer of about 24:76 to about 2.5:97.5 in.

The aromatic vinyl-cyanide vinyl based copolymer (C) is formed by polymerizing about 60 to about 95% by weight of an aromatic vinyl-based compound, about 5 to about 40% by weight of a vinyl cyanide based compound, and about 0 to about 10% by weight of a (meth)acrylic acid alkyl ester.

In exemplary embodiments of the present invention, the unsaturated hydroxyl group or unsaturated carboxyl group of the (meth)acrylic acid alkyl ester-based polymer (A) may be connected to the carboxyl groups or hydroxyl groups of the (meth)acrylic acid alkyl ester-based oligomeric prepolymer (B) by ester-bonds. In this manner, it is possible to connect (or link) the (meth)acrylic acid alkyl ester-based polymer (A) and the (meth)acrylic acid alkyl ester-based oligomeric prepolymer (B).

In exemplary embodiments of the present invention, the thermoplastic resin composition of the invention can include a weight ratio of the (meth)acrylic acid alkyl ester-based polymer (A) to the aromatic vinyl-cyanide vinyl based copolymer (C) of about 5:95 to about 35:65. The (meth)acrylic acid alkyl ester-based oligomeric prepolymer (B) is used in an amount of an equivalent ratio of about 0.1 to about 3 based on the unsaturated hydroxy or carboxylic acid compound unit of the (meth)acrylic acid alkyl ester-based polymer (A).

The (meth)acrylic acid alkyl ester-based oligomeric prepolymer (B) can have a number-average molecular weight of about 600 to about 7,000.

The aromatic vinyl-cyanide vinyl based copolymer (C) can have a weight-average molecular weight of about 150,000 to about 300,000.

The present invention further provides a method for preparing a weather resistant thermoplastic resin of the present invention. The method of the present invention comprises a first step of successively injecting a first monomer mixture comprising about 60 to about 95% by weight of a (meth)acrylic acid alkyl ester compound, about 1 to about 20% by weight of an unsaturated hydroxy or carboxylic acid compound, about 0 to about 20% by weight of an aromatic vinyl-based compound, and about 0 to about 10% by weight of a vinyl cyanide based compound into a first reactor among plural reactors connected to each other in series to polymerize the first monomer mixture; a second step of polymerizing a second mixture of mercapto compound having either two or more carboxyl groups or two or more hydroxyl groups and a (meth)acrylic acid alkyl ester monomer to obtain a (meth) acrylic acid alkyl ester-based oligomeric prepolymer (B) having either two or more carboxyl groups or two or more hydroxyl groups in a second reactor which is connected in parallel with the first reactor; and the third step of successively injecting the polymerized polymers from the first reactor and second reactor, respectively, and a third monomer mixture comprising about 60 to about 95% by weight of an aromatic vinyl-based compound, about 5 to about 40% by weight of a vinyl cyanide based compound, and about 0 to about 10% by weight of a (meth)acrylic acid alkyl ester into a third reactor to polymerize the polymerized polymers from the first reactor and second reactor, respectively, and the third monomer mixture.

In exemplary embodiments of the present invention, the polymer compound of the first monomer mixture can have a polymerization conversion ratio of about 85 to about 95% in the first reactor.

In exemplary embodiments of the present invention, the (meth)acrylic acid alkyl ester-based oligomeric prepolymer (B) can have a polymerization conversion ratio of about 80 to about 97% in the second reactor.

In exemplary embodiments of the present invention, the final conversion ratio of the final thermoplastic resin can be about 50 to about 70% in the final reactor.

In exemplary embodiments of the present invention, the method uses the first reactor and the second reactor connected in parallel, and includes the step of injecting the polymer compounds from the first reactor and second reactor together into a third reactor.

In exemplary embodiments of the present invention, the flow rate can be controlled so that a reactant injected into the third reactor includes about 5 to about 15% by weight of the polymer compound which is polymerized in the first reactor and about 85 to about 95% by weight of the total amount of the (meth)acrylic acid alkyl ester-based oligomeric prepolymer (B) and the third monomer mixture.

BRIEF DESCRIPTION OF THE FIGURE

FIG. 1 is a transmission electron microscope image of a thermoplastic resin composition according to the present invention in which the (meth)acrylic acid alkyl ester-based polymer (A) and the (meth)acrylic acid alkyl ester-based oligomeric prepolymer (B) form a network-shaped disperse phase and the aromatic vinyl-cyanide vinyl based copolymer (C) forms a continuous phase.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition of the present invention comprises a (meth)acrylic acid alkyl ester-based polymer (A) and a (meth)acrylic acid alkyl ester-based oligomeric prepolymer (B), and an aromatic vinyl-cyanide vinyl based copolymer (C).

The (meth)acrylic acid alkyl ester-based polymer (A) and the (meth)acrylic acid alkyl ester-based oligomeric prepolymer (B) form a network-shaped disperse phase and the aromatic vinyl-cyanide vinyl based copolymer (C) forms a continuous phase.

The term "network-shape" as used herein means that the (meth)acrylic acid alkyl ester-based polymer (A) and the (meth)acrylic acid alkyl ester-based oligomeric prepolymer (B) are connected each other.

The connection between the (meth)acrylic acid alkyl ester-based polymer (A) and the (meth)acrylic acid alkyl ester-based oligomeric prepolymer (B) can provide low gloss characteristics and can impart impact strength to the (meth)acrylic acid alkyl ester-based oligomeric prepolymer (B).

Thus, the thermoplastic resin composition of the present invention can have excellent low gloss characteristics and impact strength. Further, the bonding strength between disperse phases of the (meth)acrylic acid alkyl ester-based polymer (A) and the (meth)acrylic acid alkyl ester-based oligomeric prepolymer (B) is stronger than the bonding strength of a disperse phase formed by the (meth)acrylic acid alkyl ester-based polymer (A) alone because of the connection of the (meth)acrylic acid alkyl ester-based polymer (A) and the (meth)acrylic acid alkyl ester-based oligomeric prepolymer (B) to form a network-shaped disperse phase.

The weight ratio of the (meth)acrylic acid alkyl ester-based polymer (A) to the aromatic vinyl-cyanide vinyl based copolymer (C) is about 5:95 to about 35:65, for example about 5:95 to about 25:75.

In some embodiments, the thermoplastic resin composition can include the (meth)acrylic acid alkyl ester-based polymer (A) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35% by weight. Further, according to some embodiments of the present invention, the amount of the (meth)acrylic acid alkyl ester-based polymer (A) can be in a range from about any of the foregoing amounts to about any other of the foregoing amounts.

In some embodiments, the thermoplastic resin composition can include the aromatic vinyl-cyanide vinyl based copolymer (C) in an amount of about 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl-cyanide vinyl based copolymer (C) can be in a range from about any of the foregoing amounts to about any other of the foregoing amounts.

If the amount of the (meth)acrylic acid alkyl ester-based polymer (A) is less than about 5% by weight or more than about 35% by weight, it can be difficult to obtain a weather resistant thermoplastic resin having excellent low gloss characteristics.

The (meth)acrylic acid alkyl ester-based oligomeric prepolymer (B) may be used in an amount of an equivalent ratio of about 0.1 to about 3, for example about 0.5 to about 2, based on the copolymerized unsaturated hydroxy or carboxylic acid compound of the (meth)acrylic acid alkyl ester-based polymer (A).

In some embodiments, the (meth)acrylic acid alkyl ester-based oligomeric prepolymer (B) may be used in an amount of an equivalent ratio of about 0.1, 0.2, 0.3, 0.4, 0.5, 0.6, 0.7, 0.8, 0.9, 1, 2, or 3, based on the copolymerized unsaturated hydroxy or carboxylic acid compound of the (meth)acrylic acid alkyl ester-based polymer (A). Further, according to some embodiments of the present invention, the amount of the (meth)acrylic acid alkyl ester-based oligomeric prepolymer (B) can be in a range from about any of the foregoing amounts to about any other of the foregoing amounts.

The (meth)acrylic acid alkyl ester-based polymer (A) and the (meth)acrylic acid alkyl ester-based oligomeric prepolymer (B) form a disperse phase of the thermoplastic resin, and the aromatic vinyl-cyanide vinyl based copolymer (C) forms a continuous phase of the thermoplastic resin. More particularly, the (meth)acrylic acid alkyl ester-based polymer (A) and the (meth)acrylic acid alkyl ester-based oligomeric prepolymer (B) form a network-shaped disperse phase, and the aromatic vinyl-cyanide vinyl based copolymer (C) forms a continuous phase. The network-shape means that the (meth)acrylic acid alkyl ester-based polymer (A) and the (meth)acrylic acid alkyl ester-based oligomeric prepolymer (B) are connected or linked to each other.

In exemplary embodiments of the present invention, the (meth)acrylic acid alkyl ester-based polymer (A) is prepared by polymerization of a (meth)acrylic acid alkyl ester compound and an unsaturated hydroxy or carboxylic acid compound.

The chains of the (meth)acrylic acid alkyl ester-based polymer (A) including a (meth)acrylic acid alkyl ester compound unit and an unsaturated hydroxy or carboxylic acid compound unit are built by the polymerization of the (meth)acrylic acid alkyl ester compound and the unsaturated hydroxy or carboxylic acid compound unit.

Hydroxyl group(s) or carboxyl group(s) of the unsaturated hydroxy or carboxylic acid compound unit of the (meth)acrylic acid alkyl ester-based polymer (A) may be connected to the carboxyl group(s) or hydroxyl group(s) of the (meth)acrylic acid alkyl ester-based oligomeric prepolymer (B) by ester-bonds. Therefore, it is possible to connect the (meth)acrylic acid alkyl ester-based polymer (A) and the (meth)acrylic acid alkyl ester-based oligomeric prepolymer (B) so that the chains of the (meth)acrylic acid alkyl ester-based polymer (A) forms the dispersed phase.

In exemplary embodiments, the (meth)acrylic acid alkyl ester-based polymer (A) may comprise a (meth)acrylic acid alkyl ester compound, an unsaturated hydroxy or carboxylic acid compound, an aromatic vinyl-based compound, and/or a vinyl cyanide based compound.

When the (meth)acrylic acid alkyl ester-based polymer (A) is polymerized with an aromatic vinyl-based compound and/or a vinyl cyanide based compound, the chains of the (meth)acrylic acid alkyl ester-based polymer (A) may include a (meth)acrylic acid alkyl ester compound unit, an unsaturated hydroxy or carboxylic acid compound unit, an aromatic vinyl-based compound unit; and/or a vinyl cyanide based compound unit.

As aforementioned, hydroxyl group(s) or carboxyl group (s) in the chains of the (meth)acrylic acid alkyl ester-based polymer (A) are connected to carboxyl group(s) or hydroxyl group(s) of the (meth)acrylic acid alkyl ester-based oligomeric prepolymer (B) by ester-bonds.

In exemplary embodiments of the present invention the (meth)acrylic acid alkyl ester-based oligomeric prepolymer (B) is prepared by polymerization of a multi-functional mercapto compound having either two or more carboxyl groups or two or more hydroxyl groups and a (meth)acrylic acid alkyl ester monomer. A dispersed phase is formed by ester-bonding between carboxyl groups or hydroxyl groups of the multi-functional mercapto compound and the (meth)acrylic acid alkyl ester-based polymer (A), respectively.

In an exemplary of the present invention, the (meth)acrylic acid alkyl ester-based polymer (A) comprises about 60 to about 95% by weight of a (meth)acrylic acid alkyl ester; about 1 to about 20% by weight of an unsaturated hydroxy or carboxylic acid compound; about 0 to about 20% by weight of an aromatic vinyl-based compound; and about 0 to about 10% by weight of a vinyl cyanide based compound.

In some embodiments, the (meth)acrylic acid alkyl ester-based polymer (A) can include the (meth)acrylic acid alkyl ester in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the (meth)acrylic acid alkyl ester can be in a range from about any of the foregoing amounts to about any other of the foregoing amounts.

In some embodiments, the (meth)acrylic acid alkyl ester-based polymer (A) can include the unsaturated hydroxy or carboxylic acid compound in an amount of about 1, 2, 3, 4, 5, 6, 7 8, 9, 10, 11, 12, 13, 14, 15, 16, 17, 18, 19 or 20% by weight. Further, according to some embodiments of the present invention, the amount of the unsaturated hydroxy or carboxylic acid compound can be in a range from about any of the foregoing amounts to about any other of the foregoing amounts.

In some embodiments, the (meth)acrylic acid alkyl ester-based polymer (A) may not include the aromatic vinyl-based compound (I.e., the (meth)acrylic acid alkyl ester-based polymer (A) may include 0% by weight of the aromatic vinyl-based compound). In some embodiments, the aromatic vinyl-based compound may be present in the (meth)acrylic acid alkyl ester-based polymer (A), i.e., the (meth)acrylic acid alkyl ester-based polymer (A) may include the aromatic vinyl-based compound in an amount of greater than and/or about 0, 1, 2, 3, 4, 5, 6, 7, 8, 9, 10, 11, 12, 13, 14, 15, 16, 17, 18, 19, or 20% by weight. Further, according to some embodiments of the present invention, the amount of the aromatic vinyl-based compound can be in a range from about any of the foregoing amounts to about any other of the foregoing amounts.

In some embodiments, the (meth)acrylic acid alkyl ester-based polymer (A) may not include the vinyl cyanide based compound (I.e., the (meth)acrylic acid alkyl ester-based polymer (A) may include 0% by weight of the vinyl cyanide based compound). In some embodiments, the vinyl cyanide based compound may be present in the (meth)acrylic acid alkyl ester-based polymer (A), i.e., the (meth)acrylic acid alkyl ester-based polymer (A) may include the vinyl cyanide based compound in an amount of greater than and/or about 0, 1, 2, 3, 4, 5, 6, 7, 8, 9, or 10% by weight. Further, according to some embodiments of the present invention, the amount of the vinyl cyanide based compound can be in a range from about any of the foregoing amounts to about any other of the foregoing amounts.

If the composition includes the noted components in amounts outside of these ranges, it can be difficult to obtain a weather resistant thermoplastic resin having excellent low gloss characteristics.

In exemplary embodiments, the (meth)acrylic acid alkyl ester-based polymer (A) comprises about 75 to about 95% by weight of a (meth)acrylic acid alkyl ester; about 1 to about 10% by weight of an unsaturated hydroxy or carboxylic acid compound, about 1 to about 10% by weight of an aromatic vinyl-based compound; and about 1 to about 8% by weight of a vinyl cyanide based compound.

The (meth)acrylic acid alkyl ester of the (meth)acrylic acid alkyl ester-based polymer (A) can be a (meth)acrylic acid alkyl ester having a C1 to C10 alkyl group. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, ethyl hexyl acrylate and the like. The (meth)acrylic acid alkyl ester may be employed singly or in the form of combinations of two or more thereof. In exemplary embodiments, the (meth)acrylic acid alkyl ester includes butyl acrylate.

Examples of the aromatic vinyl-based compound may comprise, but are not limited to, styrene, α-methyl styrene, para-methyl styrene, and the like. The aromatic vinyl-based compound may be employed singly or in the form of combinations of two or more thereof. In exemplary embodiments, the aromatic vinyl-based compound includes styrene.

Examples of the vinyl cyanide based compound may comprise, but are not limited to, acrylonitrile, methacrylonitrile, ethacrylonitrile, and the like. The vinyl cyanide based compound may be employed singly or in the form of combinations of two or more thereof. In exemplary embodiments, the vinyl cyanide based compound includes acrylonitrile.

The unsaturated compound having a hydroxyl group can be a compound which has double bonds or triple bonds of carbon atoms within a molecule thereof and also has a hydroxyl group. Examples of the unsaturated compound having a hydroxyl group may comprise, but are not limited to, hydroxyalkyl acrylates, hydroxyalkyl methacrylates and combinations thereof. The hydroxyalkyl acrylates and hydroxyalkyl methacrylates can have an alkyl group of 1 to 10 carbon atoms. Specific examples of the hydroxyalkyl acrylate and hydroxyalkyl methacrylate may comprise without limitation 2-hydroxyethyl acrylate, 2-hydroxyethyl methacrylate, and the like, and combinations thereof.

The unsaturated carboxylic acid is a carboxylic acid or carboxylic acid anhydride having a double bond of carbon atoms within a molecule thereof. Examples of the unsaturated carboxylic acid or its anhydride may comprise, but are not limited to, acrylic acid, methacrylic acid, maleic acid, maleic anhydride, fumaric acid, fumaric anhydride, and the like. The unsaturated carboxylic acid or its anhydride may be employed singly or in the form of combinations of two or more thereof.

The (meth)acrylic acid alkyl ester-based oligomeric prepolymer (B) forms a dispersed phase by ester-bonding with the (meth)acrylic acid alkyl ester-based polymer (A). The (meth)acrylic acid alkyl ester-based oligomeric prepolymer (B) can be prepared by polymerizing a mixture comprising a mercapto compound having either two or more carboxyl groups or two or more hydroxyl groups, and a (meth)acrylic acid alkyl ester monomer.

In exemplary embodiments, the (meth)acrylic acid alkyl ester-based oligomeric prepolymer (B) is prepared by polymerization of a multi-functional mercapto compound having either two or more carboxyl groups or two or more hydroxyl groups and a (meth)acrylic acid alkyl ester monomer, so that the (meth)acrylic acid alkyl ester-based oligomeric prepolymer (B) can have either two or more carboxyl groups or two or more hydroxyl groups.

The mole ratio of the multi-functional mercapto compound to the (meth)acrylic acid alkyl ester monomer is in the range of about 24:76 to about 2.5:97.5, for example, about 12:88 to about 3.5:96.5.

In some embodiments, the mole % of the multi-functional mercapto compound can range from about 2.5, 3, 4, 5, 6, 7, 8, 9, 10, 11, 12, 13, 14, 15, 16, 17, 18, 19, 20, 21, 22, 23, or 24 mole %. Further, according to some embodiments of the present invention, the mole % of the multi-functional mercapto compound can be in a range from about any of the foregoing amounts to about any other of the foregoing amounts.

In some embodiments, the mole % of the (meth)acrylic acid alkyl ester monomer can range from about 76, 77, 78, 79, 80, 81, 82, 83, 84, 85, 86, 87, 88, 89, 90, 91, 92, 93, 94, 95, 96, 96.1, 96.2, 96.3, 96.4, or 96.5 mole %. Further, according to some embodiments of the present invention, the mole % of the (meth)acrylic acid alkyl ester monomer can be in a range from about any of the foregoing amounts to about any other of the foregoing amounts.

If the mole ratio of the multi-functional mercapto compound is less than about 2.5 mole %, Vicat softening point can decrease rapidly, since the molecular weight of the (meth) acrylic acid alkyl ester-based oligomeric prepolymer (B) which is used in an equivalent ratio based on an unsaturated hydroxy or carboxylic acid compound unit of the (meth) acrylic acid alkyl ester-based polymer (A) can increase too much. If the mole ratio of the multi-functional mercapto compound is more than about 24 mole %, it can be difficult to control the process because the heat of reaction can increase too much due to the increased amount of multi-functional mercapto compound when the (meth)acrylic acid alkyl ester-based oligomeric prepolymer (B) is polymerized. Further, excess amounts of the two or more carboxyl groups or hydroxyl groups of the oligomeric compound which do not participate in the reaction can remain, which can deteriorate the properties of the resin composition and make it difficult to form the independent dispersed phase.

In exemplary embodiments of the present invention, the (meth)acrylic acid alkyl ester-based oligomeric prepolymer (B) is used an amount of an equivalent ratio of about 0.1 to about 3, for example, about 0.5 to about 2.0, based on the unsaturated hydroxy or carboxylic acid compound of the (meth)acrylic acid alkyl ester-based polymer (A). In some embodiments, the (meth)acrylic acid alkyl ester-based oligomeric prepolymer (B) is used in an equivalent ratio of about 0.1, 0.2, 0.3, 0.4, 0.5, 0.6, 0.7, 0.8, 0.9, 1, 2, or 3 with respect to the unsaturated hydroxy or carboxylic acid compound of the (meth)acrylic acid alkyl ester-based polymer (A). Further, according to some embodiments of the present invention, the amount of the (meth)acrylic acid alkyl ester-based oligomeric prepolymer (B) can be in a range from about any of the foregoing amounts to about any other of the foregoing amounts.

If the equivalent ratio of the (meth)acrylic acid alkyl ester-based oligomeric prepolymer (B) having either two or more hydroxyl groups or carboxyl group is less than about 0.1, it can be difficult to form a network-shaped disperse phase since links between the chains of the (meth)acrylic acid alkyl ester-based polymer (A) may be insufficient. If the equivalent ratio of the (meth)acrylic acid alkyl ester-based oligomeric prepolymer (B) having either two or more hydroxyl groups or carboxyl group is more than about 3, thermal resistance may rapidly deteriorate because excess amounts of the (meth) acrylic acid alkyl ester-based oligomeric prepolymer (B) having either two or more hydroxyl groups or two or more carboxyl groups which do not participate in the reaction can function as a plasticizer in the continuous phase.

Examples of the multi-functional mercapto compound having either two or more carboxyl groups or two or more hydroxyl groups of the (meth)acrylic acid alkyl ester-based oligomeric prepolymer (B) may comprise, but are not limited to, mercapto propandiol, mercaptosuccinic acid, mercapto purinediol, mercapto triazinediol and the like. The mercapto compound may be employed singly or in the form of combinations of two or more thereof. In exemplary embodiments, the multi-functional mercapto compound can include mercapto propandiol, mercaptosuccinic acid having carboxyl group, or a combination thereof.

The (meth)acrylic acid alkyl ester of the (meth)acrylic acid alkyl ester-based oligomeric prepolymer (B) can be a (meth) acrylic acid alkyl ester having a C1 to C10 alkyl group. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, 2-ethyl hexyl methacrylate, methyl acrylate, ethyl acrylate, propyl acrylate, butyl acrylate, pentyl acrylate, hexyl acrylate, heptyl acrylate, octyl acrylate, 2-ethyl hexyl acrylate and the like. The (meth)acrylic acid alkyl ester may be employed singly or in the form of combinations of two or more thereof. In exemplary embodiments, the (meth)acrylic acid alkyl ester includes butyl acrylate.

The (meth)acrylic acid alkyl ester-based oligomeric prepolymer (B) can have a number-average molecular weight of about 600 to about 7,000, for example, about 1,500 to about 5,000.

The distribution of molecular weight can be between 1.3 and 2.0, and the weight average molecular weight determined according to the distribution of molecular weight.

In order to polymerize the (meth)acrylic acid alkyl ester-based oligomeric prepolymer (B) which has a number-average molecular weight less than 600, the amount of injected mercapto compound is so large that the heat of initiative exothermic reaction also increases. In contrast, if the (meth) acrylic acid alkyl ester-based oligomeric prepolymer (B) having a number-average molecular weight more than 7,000 is polymerized, the amount of injected mercapto compound is so small that the reaction speed is so slow, and molecular weight begins to increase. Accordingly, the molecular weight of the (meth)acrylic acid alkyl ester-based oligomeric prepolymer (B) which is used in an equivalent ratio based on the unsaturated hydroxy or carboxylic acid compound of the (meth)acrylic acid alkyl ester-based polymer (A) can increase so high that the Vicat softening point can begin to decrease rapidly.

The aromatic vinyl-cyanide vinyl based copolymer (C) formed in a continuous phase in the thermoplastic resin according to the present invention is formed by polymerizing an aromatic vinyl-based compound and a vinyl cyanide based compound.

The aromatic vinyl-cyanide vinyl based copolymer (C) may be prepared by polymerizing a (meth)acrylic acid alkyl ester together with the aromatic vinyl-based compound and vinyl cyanide based compound.

For example, the aromatic vinyl-cyanide vinyl based copolymer (C) can be formed by polymerizing about 60 to about 95% by weight of an aromatic vinyl-based compound, about 5 to about 40% by weight of a vinyl cyanide based compound, and about 0 to about 10% by weight of a (meth) acrylic acid alkyl ester.

In some embodiments, the aromatic vinyl-cyanide vinyl based copolymer (C) can include the aromatic vinyl-based compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl-based compound can be in a range from about any of the foregoing amounts to about any other of the foregoing amounts.

In some embodiments, the aromatic vinyl-cyanide vinyl based copolymer (C) can include the vinyl cyanide based compound in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the vinyl cyanide based compound can be in a range from about any of the foregoing amounts to about any other of the foregoing amounts.

In some embodiments, the aromatic vinyl-cyanide vinyl based copolymer (C) may not include the (meth)acrylic acid alkyl ester (i.e., the aromatic vinyl-cyanide vinyl based copolymer (C) may include 0% by weight of the (meth) acrylic acid alkyl ester). In some embodiments, the (meth) acrylic acid alkyl ester may be present in the aromatic vinyl-cyanide vinyl based copolymer (C), i.e., the aromatic vinyl-cyanide vinyl based copolymer (C) may include the (meth) acrylic acid alkyl ester in an amount of greater than and/or about 0, 1, 2, 3, 4, 5, 6, 7, 8, 9, or 10% by weight. Further, according to some embodiments of the present invention, the amount of the (meth)acrylic acid alkyl ester can be in a range from about any of the foregoing amounts to about any other of the foregoing amounts.

If the amounts of the respective components are outside of the above ranges, the basic physical properties of the thermoplastic resin including impact resistance, yellowness, flow characteristics and the like may rapidly change.

As another example, the aromatic vinyl-cyanide vinyl based copolymer (C) can be formed by polymerizing about 60 to about 84% by weight of an aromatic vinyl-based compound, about 15 to about 35% by weight of a vinyl cyanide based compound, and about 1 to about 5% by weight of a (meth)acrylic acid alkyl ester.

Examples of the aromatic vinyl-based compound forming the aromatic vinyl-cyanide vinyl based copolymer (C) may comprise, but are not limited to, styrene, α-methyl styrene, para-methyl styrene and the like. The aromatic vinyl-based compound may be employed singly or in the form of combinations of two or more thereof.

Examples of the vinyl cyanide based compound used in the aromatic vinyl-cyanide vinyl based copolymer (C) may comprise, but are not limited to, acrylonitrile, methacrylonitrile, ethacrylonitrile and the like. The vinyl cyanide based compound may be employed singly or in the form of combinations of two or more thereof.

The (meth)acrylic acid alkyl ester forming the aromatic vinyl-cyanide vinyl based copolymer (C) can be a (meth) acrylic acid alkyl ester having an alkyl group of 1 to 10 carbon atoms. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and the like. The (meth)acrylic acid alkyl ester may be employed singly or in the form of combinations of two or more thereof.

The aromatic vinyl-cyanide vinyl based copolymer (C) can have a weight-average molecular weight of about 150,000 to about 300,000, for example about 180,000 to about 250,000. If the weight-average molecular weight in the continuous phase is less than about 150,000, rapid deterioration in impact strength and delamination may occur since the size of the disperse phase of the aromatic vinyl-cyanide vinyl based copolymer (C) can excessively increase. On the other hand, if the weight-average molecular weight in the continuous phase is more than about 300,000, the low gloss characteristics may deteriorate since the size of the disperse phase of the aromatic vinyl-cyanide vinyl based copolymer (C) can excessively decrease.

The thermoplastic resin according to the present invention can be prepared by continuous bulk polymerization. It is difficult to prepare the aforementioned network-shaped disperse phase using methods generally used to prepare a rubber phase, such as an emulsion polymerization method, a suspension polymerization method and the like. Further, using conventional methods, the final product should be prepared by methods such as melt extrusion and the like after separately preparing an aromatic vinyl-cyanide vinyl based copolymer formed in a continuous phase. Therefore, such methods make it difficult to efficiently prepare a weather resistant thermoplastic resin having excellent low gloss characteristics.

A thermoplastic resin of the present invention can have very excellent low gloss characteristics compared to conventional weather resistant thermoplastic resins. The thermoplastic resin can have a gloss value of about 30 or less, for example about 21 or less, which is measured using a 75 Degree Gloss Meter.

A thermoplastic resin according to the present invention can have excellent low gloss characteristics while maintaining basic physical properties of a weather resistant thermoplastic resin such as excellent flow characteristics, impact strength, thermal resistance, and transparency. Therefore, the thermoplastic resin may be widely used in electric and electronic components, materials for farm machines and implements, road signboards, finishing materials for building, door panels, window frames, leisure/household goods, sports goods, automobile supplies, and the like requiring both weatherability and low gloss characteristics.

Examples of a method of molding a thermoplastic resin according to the present invention to manufacture the aforementioned products may comprise, but not be limited to, extrusion, injection, casting and the like, which are widely used. A molding method may be easily performed by those skilled in the art.

Method of Preparing Thermoplastic Resin Having Excellent Low Gloss Characteristics The present invention provides a method of preparing the aforementioned weather resistant thermoplastic resin having excellent low gloss characteristics.

A preparation method of the present invention comprises a first step of successively injecting a first monomer mixture comprising a (meth)acrylic acid alkyl ester compound, an unsaturated hydroxy or carboxylic acid compound, an aromatic vinyl-based compound, and a vinyl cyanide based compound into a first reactor among plural reactors connected to each other in series to polymerize the first monomer mixture; a second step of polymerizing a second mixture of mercapto compound having either two or more carboxyl groups or two or more hydroxyl groups and a (meth)acrylic acid alkyl ester monomer to obtain a (meth)acrylic acid alkyl ester-based oligomeric prepolymer (B) having either two or more carboxyl groups or two or more hydroxyl groups in a second reactor which is connected in parallel with the first reactor; and a third step of successively injecting the polymerized polymers from the first reactor and second reactor, respectively, and a third monomer mixture comprising of an aromatic vinyl-based compound, a vinyl cyanide based compound, and optionally a (meth)acrylic acid alkyl ester into a third reactor to polymerize them.

Specifically, a (meth)acrylic acid alkyl ester compound and an unsaturated hydroxy or carboxylic acid compound are mixed to prepare a first monomer mixture. The polymer is then prepared by successively injecting the first monomer mixture into the first reactor among plural reactors connected to each other in series and polymerizing the first monomer mixture.

The first monomer mixture may further optionally comprise an aromatic vinyl-based compound and a vinyl cyanide based compound.

For example, the first monomer mixture can comprise about 60 to about 95% by weight of a (meth)acrylic acid alkyl ester, about 1 to about 20% by weight of a unsaturated hydroxy or carboxylic acid compound unit, about 0 to about 20% by weight of an aromatic vinyl-based compound, and about 0 to about 10% by weight of a vinyl cyanide based compound. If the amounts of the respective components in the first monomer mixture are outside of the above ranges, it can be difficult to provide a thermoplastic resin finally prepared with sufficient weatherability or low gloss characteristics.

As another example, the first monomer mixture can comprise about 70 to about 95% by weight of a (meth)acrylic acid alkyl ester, about 1 to about 10% by weight of an unsaturated hydroxy or carboxylic acid compound, about 1 to about 10% by weight of an aromatic vinyl-based compound, and about 1 to about 8% by weight of a vinyl cyanide based compound. As another example, the first monomer mixture can comprise about 80 to about 95% by weight of a (meth)acrylic acid alkyl ester, about 1 to about 5% by weight of an unsaturated hydroxy or carboxylic acid compound, about 2 to about 8% by weight of an aromatic vinyl-based compound, and about 1 to about 5% by weight of a vinyl cyanide based compound.

The (meth)acrylic acid alkyl ester and the unsaturated hydroxy or carboxylic acid compound unit which is included in the first monomer mixture form chains of the (meth)acrylic acid alkyl ester-based polymer (A) through the polymerization reaction in the first reactor. Additionally, when the first monomer mixture further comprises the aromatic vinyl-based compound and the vinyl cyanide based compound, the chains of the polymer (A) further comprise an aromatic vinyl-based compound unit and a vinyl cyanide based compound unit.

In a second reactor which is connected in parallel with the first reactor, the mercapto compound having either two or more carboxyl groups or two or more hydroxyl groups and a (meth)acrylic acid alkyl ester monomer is polymerized in order to prepare a (meth)acrylic acid alkyl ester-based oligomeric prepolymer (B) having either two or more carboxyl groups or two or more hydroxyl groups as a end group.

The polymerized polymers in the first reactor and the second reactor are successively injected into the third reactor, and the third monomer mixture including an aromatic vinyl-based compound and a vinyl cyanide based compound is also injected into the third reactor.

Thereafter, the polymerized polymers from the first reactor and the second reactor and the third monomer mixture are polymerized in the third reactor.

The second monomer mixture is successively injected as the weight ratio of the mercapto compound having either two or more carboxyl groups or two or more hydroxyl groups to the (meth)acrylic acid alkyl ester monomer is in the range of about 2.5:97.5 to about 24:76, and the (meth)acrylic acid alkyl ester-based oligomeric prepolymer (B) is prepared by polymerizing the second monomer mixture.

The prepared (meth)acrylic acid alkyl ester-based oligomeric prepolymer (B) in the second reactor can be injected into the third reactor in the equivalent ratio of about 0.1 to about 3 based on an unsaturated hydroxy or carboxylic acid compound of the (meth)acrylic acid alkyl ester-based polymer (A).

The third monomer mixture may further optionally comprise an (meth)acrylic acid alkyl ester.

For example, the third monomer mixture can comprise about 60 to about 95% by weight of an aromatic vinyl-based compound, about 5 to about 40% by weight of a vinyl cyanide based compound, and about 0 to about 10% by weight of a (meth)acrylic acid alkyl ester. If amounts of the respective components the third monomer mixture are outside of the above amounts, the basic physical properties of the thermoplastic resin including impact resistance, yellowness, flow characteristics and the like may rapidly change.

As another example, the aromatic vinyl-cyanide vinyl based copolymer (C) can comprise about 60 to about 84% by weight of an aromatic vinyl-based compound, about 15 to about 35% by weight of a vinyl cyanide based compound, and about 1 to about 5% by weight of a (meth)acrylic acid alkyl ester.

The polymer polymerized in the first reactor and the compound having either two or more carboxyl groups or hydroxyl groups polymerized in the second reactor are reacted in the third reactor, and form a dispersed phase.

More particularly, the unsaturated hydroxyl group or unsaturated carboxylic acid consisting the chains of the polymer polymerized in the first reactor may be connected to the carboxyl groups or hydroxyl groups of the (meth)acrylic acid alkyl ester-based oligomeric prepolymer (B) by ester-bonds.

If the polymer polymerized in the first reactor includes an unsaturated hydroxyl group, the (meth)acrylic acid alkyl ester-based oligomeric prepolymer (B) polymerized in the second reactor can have a carboxyl group to form an ester bond.

If the polymer polymerized in the first reactor includes an unsaturated carboxyl group, the (meth)acrylic acid alkyl ester-based oligomeric prepolymer (B) polymerized in the second reactor can have an hydroxyl group to form an ester bond in the third reactor.

Further, a third monomer mixture comprising of an aromatic vinyl-based compound, a vinyl cyanide based compound, and optionally, a (meth)acrylic acid alkyl ester is injected into a third reactor to polymerize them and to form a continuous phase.

In an exemplary embodiment of the present invention, the polymerization conversion ratio of a thermoplastic resin can be about 85 to about 95% in a first reactor, for example about 90 to about 95%. If the conversion ratio in the first reactor is less than about 85%, it is difficult to form a dispersed phase in a later process step, because of excess unreacted reactant remaining. In contrast, if the conversion ratio in the first reactor is more than about 95%, polymerization times can increase, and the processing costs can be expensive.

In an exemplary embodiment of the present invention, the first monomer mixture further comprises an initiator in the first reactor, and optionally a solvent and a molecular weight regulator may be used.

In the first reactor, about 5 to about 200 parts by weight of the solvent, about 0.1 to about 0.4 parts by weight of the initiator and about 0 to about 0.2 parts by weight of the molecular weight regulator, each based on about 100 parts by weight of the first monomer mixture, can be injected.

In an exemplary embodiment of the present invention, the polymerization conversion ratio of a thermoplastic resin can be about 80 to about 97% in a second reactor, for example about 90 to about 97%.

If the conversion ratio in the second reactor is less than about 80%, the glass transition temperature of the resin composition can decrease because the remaining (meth)acrylic acid alkyl ester-based monomer which does not participate in the reaction is copolymerized in the third reactor. If the conversion ratio in the second reactor is more than about 97%, polymerization times can increase, and the processing costs can be expensive.

The (meth)acrylic acid alkyl ester-based oligomeric prepolymer polymerized in a second reactor can be prepared by bulk polymerization with initiator, and optionally solvent further can be used. About 0 to about 100 parts by weight of the solvent based on about 100 parts by weight of the mercapto compound having either two or more carboxyl groups or two or more hydroxyl groups, and a (meth)acrylic acid alkyl ester monomer can be injected.

Also, the third monomer mixture can further comprises an initiator in the third reactor, and optionally a solvent and a molecular weight regulator may be used.

In the third reactor, about 0 to about 20 parts by weight of the solvent, about 0.01 to about 0.05 parts by weight of the initiator, and about 0 to about 0.5 parts by weight of the molecular weight regulator, each based on about 100 parts by weight of the third monomer mixture, can be injected.

Examples of the solvent may comprise, but are not limited to, ethyl benzene, xylene, toluene, methyl ethyl ketone and the like. The solvent may be employed singly or in the form of combinations of two or more thereof. The solvent may be used for effective heat transfer and agitation of reactants in the polymerization process.

Examples of the initiator may comprise, but are not limited to, azobis isobutyronitrile, benzoyl peroxide, 1,1-bis(t-butylperoxy)-2-methylcyclohexane, 1,1-bis(t-butylperoxy)cyclohexane, 2-bis(4,4-di-t-butylperoxy cyclohexane)propane, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis(m-toluoyl peroxy) hexane, t-butyl peroxy isopropyl monocarbonate, t-butyl peroxy-2-ethylhexyl monocarbonate, t-hexyl peroxybenzoate, 2,5-dimethyl-2,5-bis(benzoyl peroxy)hexane, t-butyl peroxyacetate, 2,2-bis(t-butyl peroxy)butane, t-butyl peroxybenzoate, n-butyl-4,4-bis(t-butyl peroxy)valerate, and the like, and combinations thereof.

Examples of the molecular weight regulator may comprise, but are not limited to, t-dodecyl mercaptan, n-dodecyl mercaptan and the like, and combinations thereof. The molecular weight regulator serves to regulate the molecular weight of a disperse phase.

In exemplary embodiments of the present invention, the reaction temperature of the first reactor can range from about 60 to about 120° C., and as another example about 70 to about 100° C. Further, the residence time in the first reactor can range from about 4 to about 10 hours, and as another example about 7 to about 9 hours.

The reaction temperature of the second reactor can range from about 70 to about 100° C., and as another example about 80 to about 90° C. Further, the residence time in the second reactor can range from about 0.1 to about 5 hours, and as another example about 2 to about 3 hours.

The reaction temperature of the third reactor can range from about 90 to about 130° C., and as another example about 100 to about 120° C. Further, the residence time in the second reactor can range from about 1 to about 4 hours, and as another example about 1 to about 3 hours.

In another exemplary embodiment of the present invention, the flow rate can be controlled so that a reactant injected into a third reactor includes about 5 to about 15% by weight of the polymer compound which is polymerized in the first reactor and about 85 to about 95% by weight of the total amount of a (meth)acrylic acid alkyl ester-based oligomeric prepolymer (B) and a third monomer mixture. If a composition for the reactant injected into the third reactor is controlled as mentioned above, a thermoplastic resin comprising about 5 to about 35% by weight of a (meth)acrylic acid alkyl ester-based polymer (A) and about 65 to about 95% by weight of an aromatic vinyl-cyanide vinyl based copolymer (B) may be prepared.

In an exemplary embodiment of the present invention, an amount of the (meth)acrylic acid alkyl ester-based oligomeric prepolymer (B) having either two or more carboxyl groups or two or more hydroxyl groups as a end group which is injected in the second reactor is used in an equivalent ratio of about 0.1 to about 3, for example, about 0.5 to about 2.0 based on an unsaturated hydroxy or carboxylic acid compound injected in the first reactor.

If the equivalent ratio of the (meth)acrylic acid alkyl ester-based oligomeric prepolymer (B) having either two or more hydroxyl groups or carboxyl group is less than about 0.1, it can be difficult to form a network-shaped disperse phase since the links between the chains of the (meth)acrylic acid alkyl ester-based polymer (A) may not be sufficient. Also, if the equivalent ratio of the (meth)acrylic acid alkyl ester-based oligomeric prepolymer (B) having either two or more hydroxyl groups or carboxyl group is more than about 3, thermal resistance can rapidly deteriorate since excess amounts of the (meth)acrylic acid alkyl ester-based oligomeric prepolymer (B) having either two or more hydroxyl groups or two or more carboxyl groups which do not participate in the reaction can operate as a plasticizer in the continuous phase.

In the present invention, the plural reactors can include 2 to 5 reactors which are connected in series, and 1 reactor which is connected in parallel between the first reactor and the second reactor, and the polymerization reaction can be successively carried out through from the first reactor and the second reactor.

The final polymerization conversion ratio into a thermoplastic resin in a final reactor in which the polymerization is finished can be about 50 to about 70%, and as another example about 50 to about 65%. If the final polymerization conversion ratio is less than about 50%, the amount of the thermoplastic resin prepared per unit time decreases, which is not commercially useful. It may be difficult to control the reaction heat and transfer the polymer since viscosity of the polymer rapidly increases if the final polymerization conversion ratio is more than about 70%.

In a further exemplary embodiment of the present invention, the preparation method may further comprise the step of separating non-reacted material from the final polymer using a devolatilization vessel in a high temperature and vacuum state after preparing the final polymer including network-shaped disperse and continuous phases through the successive polymerization process in the plural reactors as mentioned above. Then, the prepared thermoplastic resin may be formed in the shape of pellets by using a pelletizer or the like.

The present invention will be well understood by the following examples. The following examples of the present invention are only for illustrative purposes and are not construed as being limited to the scope of the present invention defined by the appended claims.

EXAMPLES

Example 1

A first reactant is prepared by mixing about 35 parts by weight of toluene, about 0.2 parts by weight of benzoyl peroxide (BPO) and about 0.03 parts by weight of t-dodecyl mercaptan (TDM) with about 100 parts by weight of a first monomer mixture including about 90 parts by weight of butyl acrylate (BA), about 5 parts by weight of styrene (SM), about 2 parts by weight of acrylonitrile (AN) and about 3 parts by weight of acrylic acid (AA).

A polymer is prepared by polymerizing the first reactant at a temperature of about 80° C. for a residence time of 8 hours after injecting the first reactant at a rate of about 1 kg/hr into a first reactor (R-1) of a continuous polymerization reactor having three reactors (R-1/R-2/R-3), which are connected to one another in series, and in which jackets are installed to easily control the reaction temperature. The polymerization conversion ratio is about 90%, and the polymer prepared in the first reactor (R-1) is successively injected into a third reactor (R-3) of the continuous polymerization reactor.

A second reactant is prepared by mixing butyl acrylate (BA) and mercapto propandiol in a mole ratio of butyl acrylate (BA):mercapto propandiol of 88:12, and 0.07 parts by weight of azobis isobutyronitrile as an initiator.

A polymer is prepared by polymerizing the second reactant at a temperature of about 80° C. for a residence time of 2 hours after injecting the second reactant into a second reactor (R-2) of a continuous polymerization reactor, which is connected to one another in parallel, and in which jackets are installed to easily control the reaction temperature. The polymerization conversion ratio is about 95%, and the polymer prepared in the second reactor (R-2) is successively injected into a third reactor (R-3) of the continuous polymerization reactor.

A third reactant is prepared by mixing about 10 parts by weight of toluene, about 0.02 parts by weight of 1,1-bis(t-butylperoxy)cyclohexane (PHX-C), and about 0.1 parts by weight of t-dodecyl mercaptan (TDM) with about 100 parts by weight of a second monomer mixture including about 72 parts by weight of styrene (SM), about 25 parts by weight of acrylonitrile (AN) and about 3 parts by weight of butyl acrylate (BA).

A polymer is prepared by polymerizing the third reactant at a temperature of about 110° C. for a residence time of about 2 hours after injecting the second reactant at a rate of about 4 kg/hr into the third reactor (R-3) of the continuous polymerization reactor. At this time, the polymerization conversion ratio is about 30%.

The polymer prepared in the second reactor (R-3) is successively injected into a third reactor (R-4) of the continuous polymerization reactor to polymerize the prepared polymer at a temperature of about 120° C. for a residence time of about 2 hours. The polymerization conversion ratio is about 55%.

The flow index of the thermoplastic resin is measured after successively injecting the resulting polymer discharged from the fourth reactor (R-4) into a devolatilization vessel maintained at about 240° C. and about 20 Torr, removing non-reacted monomers and solvents from the resulting polymer, and obtaining a thermoplastic resin in the shape of pellets using a pelletizer.

A weight-average molecular weight of a continuous phase of the thermoplastic resin and a content of a polymer (A) therein are measured. Physical properties such as Izod impact strength, yellowness, Vicat softening point, and the like are measured from specimens for measuring physical properties, which are manufactured by injection molding the thermoplastic resin. In addition, physical properties such as gloss, delamination characteristics, falling ball impact strength, weatherability and the like are measured from an extruded sheet having a thickness of about 1 mm which is manufactured from the thermoplastic resin using a T-die of about 190° C. The measured results are reported in the following Table 1.

Methods of Measuring Physical Properties:

(1) Flow index (g/10 min) of a specimen is measured in accordance with ASTM D-1238, under a condition of about 220° C./10 kg.

(2) Weight-average molecular weight: An elution curve of a specimen is obtained by using THF as a moving bed through a gel permeation chromatography (GPC) at room temperature, and a relative number-average molecular weight, a weight-average molecular weight and a molecular weight distribution of the specimen are calculated (by using a GPC, LF-804 column from Waters Corporation) based on the standard polystyrene polymer.

(3) Content (%) of polymer (A): The oxygen content in the thermoplastic resin is measured by using Flash EA 1112 from Thermo Finnigan Corporation, and the content is calculated using molecular weight of an acrylate monomer.

(4) Izod impact strength (kgf·cm/cm) is measured in accordance with ASTM D256 under a ⅛" notched condition.

(5) Yellowness is measured in accordance with JIS K7105.

(6) Delamination characteristics of an extruded sheet are measured by giving a grade between one and five points depending on the degree of delamination after observing a surface state of the extruded sheet with the naked eye. Five points are given if delamination is not observed from the extruded sheet, and one point is given if delamination is observed all over the extruded sheet (Five points: highest grade, four points: higher grade, three points: medium grade, two points: lower grade, one point: lowest grade).

(7) Vicat softening point (° C.) of a specimen is measured in accordance with ISO R 306 under conditions of 5 kg and 50° C./HR.

(8) Gloss: 75 degree gloss is measured using a BYK-Gardner gloss meter.

(9) Falling ball impact strength (J) is measured in accordance with ASTM D4226.

(10) Weatherability: AAE value is measured in accordance with UL 746C.

Example 2

A thermoplastic resin is prepared by the same method as in Example 1 except that a mole ratio for butyl acrylate (BA):mercapto propandiol of 94:6 is used instead of 88:12 among the mixture of the second reactor (R-2). Physical properties are measured by the same methods as in Example 1, and the measured results are reported in the following Table 1.

Example 3

A thermoplastic resin is prepared by the same method as in Example 1 except that a mole ratio for butyl acrylate (BA):mercapto propandiol of 96.5:3.5 is used instead of 88:12 among the mixture of the second reactor (R-2). Physical properties are measured by the same methods as in Example 1, and the measured results are reported in the following Table 1.

Example 4

A thermoplastic resin is prepared by the same method as in Example 1 except that 3 parts by weight of 2-hydroxy ethyl acrylate (HEA) is used instead 3 parts by weight of acrylic acid (AA) among the mixture in the first reactor, and a mole ratio for butyl acrylate (BA):mercaptosuccinic acid of 83:17 is used instead of 88:12 among the mixture of the second reactor (R-2). Physical properties are measured by the same methods as in Example 1, and the measured results are reported in the following Table 1.

Example 5

A thermoplastic resin is prepared by the same method as in Example 1 except that 3 parts by weight of 2-hydroxy ethyl acrylate (HEA) is used instead 3 parts by weight of acrylic acid (AA) among the mixture in the first reactor, and a mole ratio for butyl acrylate (BA):mercaptosuccinic acid of 91.5:

8.5 is used instead of 88:12 among the mixture of the second reactor (R-2). Physical properties are measured by the same methods as in Example 1, and the measured results are reported in the following Table 1.

Comparative Example 1

A thermoplastic resin in the shape of pellets is obtained by kneading (mixing) about 40 parts by weight of an acrylate rubber, in which styrene and acrylonitrile are grafted to a butyl acrylate rubber, and about 60 parts by weight of a styrene-acrylonitrile copolymer under a temperature condition of about 220° C. in a twin screw extruder. Physical properties are measured by the same methods as in Example 1, and the measured results are reported in the following Table 2.

Comparative Example 2

A thermoplastic resin is prepared by the same method as in Example 1 except that acrylic acid (AA) is not used among the mixture in the first reactor. Physical properties are measured by the same methods as in Example 1, and the measured results are reported in the following Table 2.

Comparative Example 3

A thermoplastic resin is prepared by the same method as in Example 1 except that the polymerized (meth)acrylic acid alkyl ester-based oligomeric prepolymer (B) having two hydroxyl groups in the second reactor is not used. Physical properties are measured by the same methods as in Example 1, and the measured results are reported in the following Table 2.

Comparative Example 4

A thermoplastic resin is prepared by the same method as in Example 4 except that the polymerized (meth)acrylic acid alkyl ester-based oligomeric prepolymer (B) having two carboxylic acid groups in the second reactor is not used. Physical properties are measured by the same methods as in Example 1, and the measured results are reported in the following Table 2.

Comparative Example 5

A thermoplastic resin is prepared by the same method as in Example 1 except that the polymerized (meth)acrylic acid alkyl ester-based oligomeric prepolymer (B) having two hydroxyl groups in the second reactor is used in an equivalent ratio of 3.5 instead 1.0 based on the polymerized acrylic acid (AA) in the first reactor. Physical properties are measured by the same methods as in Example 1, and the measured results are reported in the following Table 2.

TABLE 1

| | | Example 1 | Example 2 | Example 3 | Example 4 | Example 5 |
|---|---|---|---|---|---|---|
| R1 | BA/SM/AN | 90/5/2 | 90/5/2 | 90/5/2 | 90/5/2 | 90/5/2 |
| | AA | 3 | 3 | 3 | — | — |
| | HEA | — | — | — | 3 | 3 |
| | Toluene | 35 | 35 | 35 | 35 | 35 |
| | BPO | 0.2 | 0.2 | 0.2 | 0.2 | 0.2 |
| | TDM | 0.03 | 0.03 | 0.03 | 0.03 | 0.03 |
| | flow rate (kg/hr) | 1 | 1 | 1 | 1 | 1 |
| | T (° C.) | 80 | 80 | 80 | 80 | 80 |
| | residence time(hr) | 8 | 8 | 8 | 8 | 8 |
| | Conversion (%) | 90 | 90 | 90 | 90 | 90 |
| R2 | BA (mol %) | 88 | 94 | 96.5 | 83 | 91.5 |
| | Mercapto propandiol (mol %) | 12 | 6 | 3.5 | — | — |
| | Mercapto succinic acid (mol %) | — | — | — | 17 | 8.5 |
| | T (° C.) | 80 | 80 | 80 | 80 | 80 |
| | residence time (hr) | 2 | 2 | 2 | 2 | 2 |
| | Conversion (%) | 95 | 93 | 90 | 96 | 95 |
| R3 | BA/SM/AN | 72/25/3 | 72/25/3 | 72/25/3 | 72/25/3 | 72/25/3 |
| | equivalent ratio | 1.0 | 1.0 | 1.0 | 1.0 | 1.0 |
| | Toluene | 20 | 20 | 20 | 20 | 20 |
| | PHX-C | 0.02 | 0.02 | 0.02 | 0.02 | 0.02 |
| | TDM | 0.1 | 0.1 | 0.1 | 0.1 | 0.1 |
| | flow rate(kg/hr) | 4 | 4 | 4 | 4 | 4 |
| | T (° C.) | 110 | 110 | 110 | 110 | 110 |
| | residence time(hr) | 2 | 2 | 2 | 2 | 2 |
| | Conversion (%) | 25 | 26 | 24 | 25 | 27 |
| R4 | T (° C.) | 120 | 120 | 120 | 120 | 120 |
| | residence time(hr) | 2 | 2 | 2 | 2 | 2 |
| | Conversion (%) | 55 | 57 | 57 | 59 | 57 |
| Properties | Content of polymer A (%) | 17.2 | 17.0 | 17.0 | 16.8 | 17.0 |
| | Flow index (g/10 min) | 7.2 | 7.6 | 8.2 | 7.9 | 8.0 |
| | weight-average molecular weight | 195,000 | 198,000 | 192,000 | 197,000 | 213,000 |
| | Izod impact strength (kgf · cm/cm) | 10.5 | 9.9 | 9.5 | 10.6 | 9.5 |
| | Yellowness | 17.5 | 17.8 | 18.3 | 17.4 | 18.7 |
| | Vicat softening point (° C.) | 93 | 91 | 88 | 93 | 92 |
| | Gloss | 17.5 | 16.8 | 17.0 | 18.6 | 18.0 |
| | Delamination characteristics | 5 | 5 | 5 | 5 | 5 |
| | Falling ball impact strength (J) | 5.8 | 5.9 | 5.4 | 5.8 | 5.4 |
| | Weatherability | 2.0 | 2.1 | 2.1 | 2.3 | 2.1 |

TABLE 2

|  |  | Comp. EX. 1 | Comp. EX. 2 | Comp. EX 3 | Comp. EX. 4 | Comp. EX. 5 |
|---|---|---|---|---|---|---|
| R1 | BA/SM/AN | — | 90/5/2 | 90/5/2 | 90/5/2 | 90/5/2 |
|  | AA | — | — | 3 | — | 3 |
|  | HEA | — | — | — | 3 | — |
|  | Toluene | — | 35 | 35 | 35 | 35 |
|  | BPO | — | 0.2 | 0.2 | 0.2 | 0.2 |
|  | TDM | — | 0.03 | 0.03 | 0.03 | 0.03 |
|  | flow rate (kg/hr) | — | 1 | 1 | 1 | 1 |
|  | T (° C.) | — | 80 | 80 | 80 | 80 |
|  | residence time (hr) | — | 8 | 8 | 8 | 8 |
|  | Conversion (%) | — | 88 | 90 | 90 | 90 |
| R2 | BA (mol %) | — | 88 | — | — | 88 |
|  | Mercapto propandiol (mol %) | — | 12 | — | — | 42 |
|  | Mercapto succinic acid (mol %) | — | — | — | — | — |
|  | T (° C.) | — | 80 | — | — | 80 |
|  | residence time(hr) | — | 2 | — | — | 2 |
|  | Conversion (%) | — | 95 | — | — | 95 |
| R3 | BA/SM/AN | — | 75/25/3 | 75/25/3 | 75/25/3 | 75/25/3 |
|  | equivalent ratio | — | 1.0 | 1.0 | 1.0 | 1.0 |
|  | Toluene | — | 20 | 20 | 20 | 20 |
|  | PHX-C | — | 0.02 | 0.02 | 0.02 | 0.02 |
|  | TDM | — | 0.1 | 0.1 | 0.1 | 0.1 |
|  | flow rate(kg/hr) | — | 11 | 11 | 11 | 11 |
|  | T (° C.) | — | 110 | 110 | 110 | 110 |
|  | residence time(hr) | — | 2 | 2 | 2 | 2 |
|  | Conversion (%) | — | 26 | 24 | 25 | 27 |
| R4 | T (° C.) | — | 130 | 130 | 130 | 130 |
|  | residence time(hr) | — | 2 | 2 | 2 | 2 |
|  | Conversion (%) | — | 57 | 57 | 57 | 58 |
| Properties | Content of polymer A (%) | 19.5 | 17.5 | 17.5 | 17.0 | 17.5 |
|  | Flow index (g/10 min) | 4.3 | 16.0 | 11.0 | 11.5 | 14.0 |
|  | weight-average molecular weight | 140,000 | 195,000 | 192,000 | 197,000 | 195,000 |
|  | Izod impact strength (kgf · cm/cm) | 11.2 | 5.0 | 6.3 | 6.2 | 6.0 |
|  | Yellowness | 25.5 | 17.8 | 18.3 | 17.4 | 18.7 |
|  | Vicat softening point (° C.) | 90 | 83 | 94 | 93 | 82 |
|  | Gloss | 93 | 45 | 49 | 46 | 40 |
|  | Delamination characteristics | 4 | 4 | 3 | 3 | 5 |
|  | Falling ball impact strength (J) | 6.2 | 2.4 | 2.6 | 2.8 | 2.7 |
|  | Weatherability | 2.8 | 2.5 | 2.9 | 2.8 | 2.5 |

As shown in Tables 1 and 2, the thermoplastic resin composition of the present invention which is prepared in Examples 1 to 5 has an excellent low gloss value of about 21 or less which is measured using a 75 Degree Gloss Meter with maintaining flowability, Izod impact strength, Vicat softening point, and Falling ball impact strength of a general thermoplastic resin.

Further, the thermoplastic resin composition of the present invention which is prepared in Examples 1 to 5 has good delamination characteristics and improved yellowness.

In contrast, the thermoplastic resin composition of Comparative Example 1 comprising a small rubber phase, and prepared by kneading (mixing) in a twin screw extruder has a good Izod impact strength and Falling ball impact strength, but the gloss value is high.

Also, Comparative Example 2 which does not use an unsaturated hydroxyl or carboxyl acid compound has an increased gloss value, deteriorated impact strength and delamination characteristics since the dispersed phase is not formed.

Further, the polymerized (meth)acrylic acid alkyl ester-based oligomeric prepolymer (B) in the second reactor acts like plasticizer in the continuous phase, since it is hard to form the ester-bond. Therefore, the flow index is high, and Vicat softening point rapidly decreases.

Also, Comparative Examples 3 and 4 which do not use the polymerized (meth)acrylic acid alkyl ester-based oligomeric prepolymer (B) in the second reactor have an increased gloss value, deteriorated impact strength and delamination characteristics.

Comparative Example 5 including excessive amount of the polymerized (meth)acrylic acid alkyl ester-based oligomeric prepolymer (B) having two hydroxyl groups in the second reactor compared with the Examples 1 to 5 represents a rapidly decreased Vicat softening point because the (meth)acrylic acid alkyl ester-based oligomeric prepolymer (B) having a low molecular weight which does not participate in the reaction with the unsaturated hydroxyl or carboxylic acid compound can function as a plasticizer In conclusion, as shown in the Examples and Comparative Examples, the thermoplastic resin composition of the present invention can have an excellent low gloss characteristic as well as basic physical properties such as weather resistance, impact strength, thermal resistance, and delamination characteristics.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A weatherable thermoplastic resin composition comprising:

(A) a (meth)acrylic acid alkyl ester-based polymer;
(B) a (meth)acrylic acid alkyl ester-based oligomeric prepolymer, and
(C) an aromatic vinyl-cyanide vinyl based copolymer,
wherein the (meth)acrylic acid alkyl ester-based polymer (A) and the (meth)acrylic acid alkyl ester-based oligomeric prepolymer (B) form a network-shaped disperse phase, and the aromatic vinyl-cyanide vinyl based copolymer (C) forms a continuous phase, and
wherein said (meth)acrylic acid alkyl ester-based oligomeric prepolymer (B) is prepared by polymerizing a mixture comprising a mercapto compound having either two or more carboxyl groups or two or more hydroxyl groups and a (meth)acrylic acid alkyl ester monomer.

2. The weatherable thermoplastic resin composition of claim 1, wherein said (meth)acrylic acid alkyl ester-based polymer (A) comprises a (meth)acrylic acid alkyl ester compound unit and an unsaturated hydroxy or carboxylic acid compound unit.

3. The weatherable thermoplastic resin composition of claim 2, wherein said (meth)acrylic acid alkyl ester-based polymer (A) comprises about 60 to about 95% by weight of a (meth)acrylic acid alkyl ester compound unit; about 1 to about 20% by weight of an unsaturated hydroxy or carboxylic acid compound unit; about 0 to about 20% by weight of an aromatic vinyl-based compound; and about 0 to about 10% by weight of a vinyl cyanide based compound.

4. The weatherable thermoplastic resin composition of claim 1, wherein the (meth)acrylic acid alkyl ester-based oligomeric prepolymer (B) comprises a mole ratio of the mercapto compound having either two or more carboxyl groups or two or more hydroxyl groups to the (meth)acrylic acid alkyl ester monomer of about 24:76 to about 2.5: 97.5.

5. The weatherable thermoplastic resin composition of claim 2, wherein the (meth)acrylic acid alkyl ester-based polymer (A) and the (meth)acrylic acid alkyl ester-based oligomeric prepolymer (B) are connected by ester-bonds between the unsaturated hydroxyl group or unsaturated carboxyl group of the (meth)acrylic acid alkyl ester-based polymer (A) and the carboxyl groups or hydroxyl groups of the (meth)acrylic acid alkyl ester-based oligomeric prepolymer (B).

6. The weatherable thermoplastic resin composition of claim 1, wherein the aromatic vinyl-cyanide vinyl based copolymer (C) comprises about 60 to about 95% by weight of an aromatic vinyl-based compound, about 5 to about 40% by weight of a vinyl cyanide based compound, and about 0 to about 10% by weight of a (meth)acrylic acid alkyl ester.

7. The weatherable thermoplastic resin composition of claim 2, comprising a weight ratio of the (meth)acrylic acid alkyl ester-based polymer (A) to the aromatic vinyl-cyanide vinyl based copolymer (C) of about 5:95 to about 35:65, and wherein the (meth)acrylic acid alkyl ester-based oligomeric prepolymer (B) is present in an amount of an equivalent ratio of about 0.1 to about 3 based on the copolymerized unsaturated hydroxy or carboxylic acid compound of the (meth)acrylic acid alkyl ester-based polymer (A).

8. The weatherable thermoplastic resin composition of claim 2, wherein said (meth)acrylic acid alkyl ester unit comprises methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, ethyl hexyl acrylate, or a combination thereof.

9. The weatherable thermoplastic resin composition of claim 2, wherein said unsaturated hydroxy or carboxylic acid compound unit comprises hydroxyalkyl acrylate, hydroxyalkyl methacrylate, acrylic acid, methacrylic acid, maleic acid, maleic anhydride, fumaric acid, fumaric anhydride, or a combination thereof.

10. The weatherable thermoplastic resin composition of claim 1, wherein said mercapto compound having either two or more carboxyl groups or two or more hydroxyl groups comprises mercapto propandiol, mercaptosuccinic acid, mercapto purinediol, mercapto triazinediol, or a combination thereof.

11. The weatherable thermoplastic resin composition of claim 6, wherein said aromatic vinyl-based compound comprises styrene, a-methyl styrene, para-methyl styrene, or a combination thereof, and wherein said vinyl cyanide based compound comprises acrylonitrile, methacrylonitrile, ethacrylonitrile, or a combination thereof.

12. The weatherable thermoplastic resin composition of claim 1, wherein said (meth)acrylic acid alkyl ester-based oligomeric prepolymer (B) has a number-average molecular weight of about 600 to about 7,000.

13. The weatherable thermoplastic resin composition of claim 1, wherein said aromatic vinyl-cyanide vinyl based copolymer (C) has a weight-average molecular weight of about 150,000 to about 300,000.

14. The weatherable thermoplastic resin composition of claim 1, wherein the thermoplastic resin has a gloss value of about 30 or less, measured using a 75 Degree BYK-Gardner Gloss Meter of an extruded sheet formed of the composition having a thickness of about 1 mm.

\* \* \* \* \*